(12) United States Patent
Batzler et al.

(10) Patent No.: US 10,987,762 B2
(45) Date of Patent: *Apr. 27, 2021

(54) ARMBAND BASED SYSTEMS AND METHODS FOR CONTROLLING WELDING EQUIPMENT USING GESTURES AND LIKE MOTIONS

(71) Applicant: Illinois Tool Works Inc., Glenview, IL (US)

(72) Inventors: Todd Gerald Batzler, Hortonville, WI (US); Robert Arthur Batzler, Hortonville, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/659,853

(22) Filed: Mar. 17, 2015

(65) Prior Publication Data

US 2016/0089751 A1 Mar. 31, 2016

Related U.S. Application Data

(63) Continuation-in-part of application No. 14/502,599, filed on Sep. 30, 2014, now Pat. No. 10,201,868.

(51) Int. Cl.
*B23K 9/095* (2006.01)
*B23K 31/02* (2006.01)
(Continued)

(52) U.S. Cl.
CPC ............ *B23K 31/02* (2013.01); *B23K 9/1087* (2013.01); *G06F 3/016* (2013.01); *G06F 3/017* (2013.01);
(Continued)

(58) Field of Classification Search
CPC .......... B23K 9/10; B23K 9/32; B23K 9/0953; B23K 9/0956; B23K 9/1087
(Continued)

(56) References Cited

U.S. PATENT DOCUMENTS 4,021,840 A 5/1977 Ellsworth et al.
4,093,844 A * 6/1978 Fellure ................. B23K 9/0735
219/124.02

(Continued)

FOREIGN PATENT DOCUMENTS

CA 2725719 A1 6/2012
CN 1266391 9/2000
(Continued)

OTHER PUBLICATIONS

Kevin Dixon, et al., "Gesture-based Programming for Robotic Arc Welding", Carnegie Mellon University, dated Dec. 6, 2002 (24 pages).

(Continued)

*Primary Examiner* — Robert J Utama
*Assistant Examiner* — Ayub A Maye
(74) *Attorney, Agent, or Firm* — McAndrews, Held & Malloy, Ltd.

(57) ABSTRACT

Portable, wearable or integrate-able devices may be used in detecting gestures or motions by operators of welding systems, and performing actions based thereon. The detection may be performed using sensors (e.g., MEMS or muscle sensors), which generate sensory data. The detected gestures or motions may be processed and translated into corresponding actions or commands, which may be handled directly or communicated to other devices in the welding systems. The actions or commands may comprise welding actions/commands, which are configured for controlling a particular component used during welding operations, and/or gesture- (Continued)

related actions/commands, which are configured for controlling gesture-related components and/or operations. Feedback is provided to the operator, such as to acknowledge or validate detection of the gestures, to identify the corresponding action or command, and to complete the identified action or command. The feedback may be non-visual feedback, such as haptic or audio feedback.

19 Claims, 9 Drawing Sheets

(51) Int. Cl.
　　　G09B 19/24　　　(2006.01)
　　　B23K 9/10　　　(2006.01)
　　　G06F 3/01　　　(2006.01)
　　　G06F 3/0346　　(2013.01)
　　　G06F 3/16　　　(2006.01)

(52) U.S. Cl.
　　　CPC .......... *G06F 3/0346* (2013.01); *G06F 3/167* (2013.01); *G09B 19/24* (2013.01)

(58) Field of Classification Search
　　　USPC ........ 219/130.1, 130.5, 137.7, 125.1, 137.71
　　　See application file for complete search history.

(56) References Cited

U.S. PATENT DOCUMENTS

| | | | |
|---|---|---|---|
| 4,577,796 A | 3/1986 | Powers et al. | |
| 4,641,292 A | 2/1987 | Tunnell et al. | |
| 4,733,051 A | 3/1988 | Nadeau et al. | |
| 4,776,323 A | 10/1988 | Spector | |
| 4,812,614 A | 3/1989 | Wang et al. | |
| 5,572,102 A | 11/1996 | Goodfellow et al. | |
| 5,923,555 A | 7/1999 | Bailey et al. | |
| 5,932,123 A | 8/1999 | Marhofer et al. | |
| 5,978,090 A | 11/1999 | Burri et al. | |
| 6,103,994 A | 8/2000 | Decoster | |
| 6,209,144 B1 | 4/2001 | Carter | |
| 6,242,711 B1 | 6/2001 | Cooper | |
| 6,271,500 B1 | 8/2001 | Hirayama | |
| 6,337,458 B1 | 1/2002 | Lepeltier | |
| 6,388,422 B1 | 5/2002 | Lew | |
| 6,476,581 B2 | 11/2002 | Lew | |
| 6,516,289 B2 | 2/2003 | David | |
| 6,624,388 B1 | 9/2003 | Blankenship | |
| 6,842,722 B2 | 1/2005 | David | |
| 7,178,932 B1 | 2/2007 | Buckman | |
| 7,457,724 B2 | 11/2008 | Vock | |
| 7,534,005 B1 | 5/2009 | Buckman | |
| 7,559,902 B2 | 7/2009 | Ting | |
| 7,698,101 B2 | 4/2010 | Alten | |
| 7,808,385 B2 | 10/2010 | Zheng | |
| 7,848,860 B2* | 12/2010 | Saposnik ................ E02F 9/267 701/29.2 |
| 7,926,118 B2 | 4/2011 | Becker et al. | |
| 7,962,967 B2 | 6/2011 | Becker et al. | |
| 8,099,258 B2 | 1/2012 | Alten | |
| 8,274,013 B2 | 9/2012 | Wallace | |
| 8,316,462 B2 | 11/2012 | Becker et al. | |
| 8,502,866 B2 | 8/2013 | Becker et al. | |
| 8,512,043 B2* | 8/2013 | Choquet ................ A61B 5/1124 219/50 |
| 8,569,655 B2 | 10/2013 | Cole | |
| 8,599,323 B2 | 12/2013 | Chen | |
| 8,605,008 B1 | 12/2013 | Prest et al. | |
| 8,680,434 B2 | 3/2014 | Stoger et al. | |
| 8,915,740 B2 | 12/2014 | Zboray et al. | |
| 8,957,835 B2 | 2/2015 | Hoellwarth | |
| 8,992,226 B1 | 3/2015 | Leach et al. | |
| 9,119,023 B2* | 8/2015 | Dina ................ H04L 12/6418 |
| 9,270,520 B2* | 2/2016 | Dina ................ B23K 9/1087 |
| 9,712,947 B2* | 7/2017 | Dina ................ H04W 8/005 |
| 2002/0180695 A1 | 12/2002 | Lawrence | |
| 2005/0233859 A1 | 10/2005 | Takai | |
| 2007/0045257 A1* | 3/2007 | Moor ................ F16P 3/144 219/121.83 |
| 2007/0102479 A1 | 5/2007 | Kan | |
| 2007/0182709 A1 | 8/2007 | Brush | |
| 2007/0187378 A1 | 8/2007 | Karakas | |
| 2008/0038702 A1 | 2/2008 | Choquet | |
| 2008/0058990 A1* | 3/2008 | Sassatelli ............... B25J 9/1656 700/264 |
| 2008/0314887 A1 | 12/2008 | Stoger | |
| 2008/0318679 A1 | 12/2008 | Tran | |
| 2009/0057286 A1 | 3/2009 | Ihara | |
| 2009/0249606 A1* | 10/2009 | Diez ................ B23K 11/11 29/428 |
| 2009/0251252 A1* | 10/2009 | Wang ................. B23K 37/0408 335/290 |
| 2009/0276930 A1 | 11/2009 | Becker | |
| 2009/0298024 A1 | 12/2009 | Batzler et al. | |
| 2010/0035688 A1 | 2/2010 | Picunko | |
| 2010/0154255 A1 | 6/2010 | Robinson | |
| 2010/0223706 A1 | 9/2010 | Becker | |
| 2011/0117527 A1 | 5/2011 | Conrardy et al. | |
| 2011/0220619 A1 | 9/2011 | Mehn | |
| 2011/0316516 A1* | 12/2011 | Schiefermuller ......... A61F 9/06 323/318 |
| 2012/0012561 A1* | 1/2012 | Wiryadinata ........ B23K 9/0956 219/108 |
| 2012/0050688 A1* | 3/2012 | Wu ........................ G03B 21/26 353/28 |
| 2012/0057240 A1 | 3/2012 | Sundell | |
| 2012/0085741 A1* | 4/2012 | Holverson ........... B23K 9/0953 219/136 |
| 2013/0081293 A1 | 4/2013 | Delin et al. | |
| 2013/0112673 A1 | 5/2013 | Petrilla | |
| 2013/0206740 A1 | 8/2013 | Pfeifer et al. | |
| 2013/0206741 A1 | 8/2013 | Pfeifer et al. | |
| 2013/0208569 A1 | 8/2013 | Pfeifer et al. | |
| 2013/0215281 A1 | 8/2013 | Hobby et al. | |
| 2013/0291271 A1 | 11/2013 | Becker | |
| 2014/0059730 A1 | 3/2014 | Kim | |
| 2014/0069900 A1 | 3/2014 | Becker | |
| 2014/0134579 A1 | 5/2014 | Becker | |
| 2014/0134580 A1 | 5/2014 | Becker | |
| 2014/0184496 A1* | 7/2014 | Gribetz ................ G06F 3/04842 345/156 |
| 2014/0185282 A1 | 7/2014 | Hsu et al. | |
| 2014/0205976 A1 | 7/2014 | Peters et al. | |
| 2014/0240125 A1* | 8/2014 | Burch ................ G08B 21/0213 340/539.13 |
| 2014/0263224 A1 | 9/2014 | Becker | |
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 | 9/2014 | Becker | |
| 2015/0009316 A1 | 1/2015 | Baldwin | |
| 2015/0072323 A1 | 3/2015 | Postlethwaite et al. | |
| 2015/0125836 A1 | 5/2015 | Daniel et al. | |
| 2015/0154884 A1 | 6/2015 | Salsich et al. | |
| 2015/0248845 A1 | 9/2015 | Postlethwaite et al. | |

FOREIGN PATENT DOCUMENTS

| | | |
|---|---|---|
| CN | 1633345 | 6/2005 |
| CN | 1665634 | 9/2005 |
| CN | 1780712 | 5/2006 |
| CN | 101068648 | 11/2007 |
| CN | 101108439 | 1/2008 |
| CN | 101352778 | 1/2009 |
| CN | 101422839 | 5/2009 |
| CN | 201249320 | 6/2009 |
| CN | 102971106 | 3/2013 |
| EP | 2022592 A1 | 2/2009 |
| EP | 2082656 A1 | 7/2009 |
| JP | 10305366 | 11/1998 |
| KR | 950003258 | 4/1995 |
| WO | 9934950 | 7/1999 |

(56) References Cited

FOREIGN PATENT DOCUMENTS

| WO | 2005084867 | | 9/2005 |
|---|---|---|---|
| WO | 2006042572 | A1 | 4/2006 |
| WO | 2007009131 | | 1/2007 |
| WO | 20081101379 | A1 | 8/2008 |
| WO | 2009/137379 | A1 | 11/2009 |

OTHER PUBLICATIONS

International Search Report and Written Opinion for PCT/US2016/013867, dated Apr. 28, 2016 (11 pages).
Li, Larry, Time-of-Flight Camera—An Introduction, Technical White Paper, SLOA190B—Jan. 2014, revised May 2014 (10 pages).
Heston, Tim, Lights, camera, lean—recording manufacturing efficiency, The Fabricator, Aug. 2010 (4 pages).
Intelligenter Schweiβbrenner, Intelligent Welding Torch, IP Bewertungs AG (IPB) (12 pages).
Intelligent Robotic Arc Sensing, Lincoln Electric, Oct. 20, 2014, http://www.lincolnelectric.com/en-us/support/process-and-theory/pages/intelligent-robotic-detail.aspx (3 pages).
LiveArc™ Welding Performance Managment System, A reality-based recruiting, screening and training solutions, MillerWelds.com 2014 (4 pages).
Handheld Welding Torch with Position Detection technology description, Sep. 21, 2011 (11 pages).
Frank Shaopeng Cheng (2008). Calibration of Robot Reference Frames for Enhanced Robot Positioning Accuracy, Robot Manipulators, Marco Ceccarelli (Ed), ISBN: 978-953-7619-06-0, InTech, Available from: http://www.intechopen.com/books/robot_manipulators/calibration_of_robot_reference_frames_for_enhanced_robot_positioning_accuracy (19 pages).
Lutwak, Dr. Robert, Micro-Technology for Positioning, Navigation, and Timing Towards PNT Everywhere and Always Stanford PNT Symposium, Stanford, CA Oct. 29, 2014 (26 pages).
Lutwak, Dr. Robert, DARPA, Microsystems Tech. Office, Micro-Technology for Positioning, Navigation, and Timing Towards PNT Everywhere and Always, Feb. 2014 (4 pages).
Parnian, Neda et al., Integration of a Multi-Camera Vision System and Strapdown Inertial Naviation System (SDINS) with a Modified Kalman Filter, Sensors 2010, 10, 5378-5394; doi: 10.3390/s100605378 (17 pages).
Pipe-Bug, Motorized & Manual Chain Driven Pipe Cutting Machines From Bug-O Systems (4 pages).
Electronic speckle pattern interferometry Wikipedia, the free encyclopedia (4 pages).
Rivers, et al., Position-Correcting Tools for 2D Digital Fabrication (7 pages).
Wavelength Selective Switching, http://en.wikipedia.org/wiki/wavelength_selective_switching, Mar. 4, 2015 (5 pages).
Cavilux® HF, Laser Light for High-Speed Imaging, See What You Have Missed (2 pages).
Cavilux® Smart, Laser Light for Monitoring and High Speed Imaging, Welcome to the Invisible World (2 pages).
Windows 10 to Get 'Holographic' Headset and Cortana, BBC News, www.bbc.com/news/technology-30924022, Feb. 26, 2015 (4 pages).
Daqri Smart Helmet, The World's First Wearable Human Machine Interface, Brochure (9 pages).
International Search Report from PCT application No. PCT/US2015/041044, dated Nov. 16, 2015, 15 pages.
"CyberGlove Data Glove: User Guide," CyberGlove Systems LLC, Dec. 2007, http://www.cyberglovesystems.com/support/; http://static1.squarespace.com/static/559c381ee4b0ff7423b6b6a4/t574f4b392eeb81ec9526760f/1464814396021/CyberGloveUserGuid_wired_rev10.pdf.
"CyberGlove II Wireless Data Glove: User Guide," CyberGlove Systems LLC, Jul. 2008, http://www.cyberglovesystems.com/support/ https://static1.squarespace.com/static/559c38lee4b0ff7123b6b6a4/t/574f4c35b654f98f724d1927/1464814655198/CyberGloveII_UserGuide_2009_0.pdf.
International Search Report for application No. PCT/US2011/043757 dated Nov. 8, 2011, 4 pages.
ESAB, "PEK Control panel", pp. 7-8, http://pdfmanuals.esab.com/private/Library/InstructionManuals/0460%20949%20174%20GB.pdf, 2009.
Canadian Office Action Appln No. 2,831,295 dated Nov. 6, 2017 (4 pages).
Lincoln Electric, "Power Wave Manager user Manual", pp. 26-27, http://lincolnelectric.com/en-za/equipment/Documents/Power-WaveManager.pdf, Jan. 25, 2011.
Canadian Office Action Appln No. 2,831,295 dated Sep. 19, 2018 (5 pages).

* cited by examiner

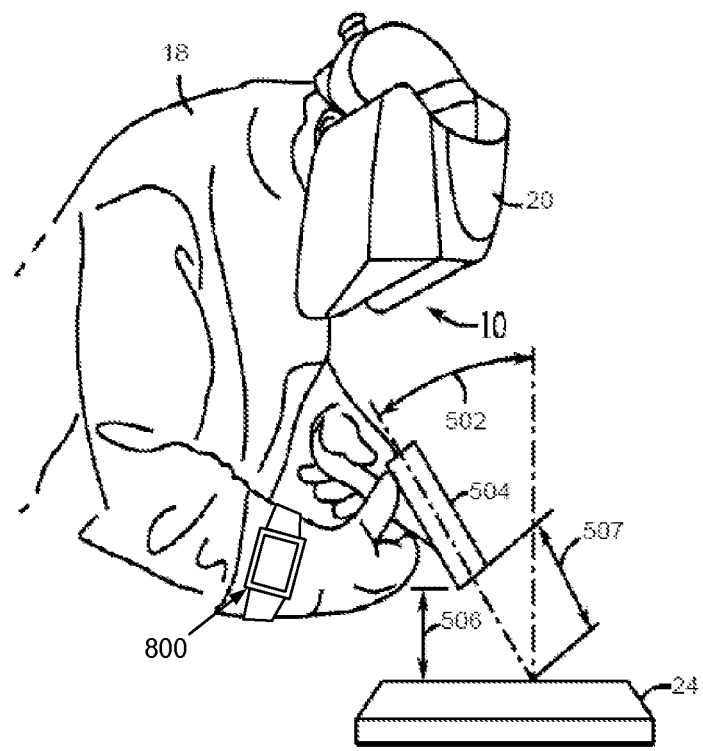
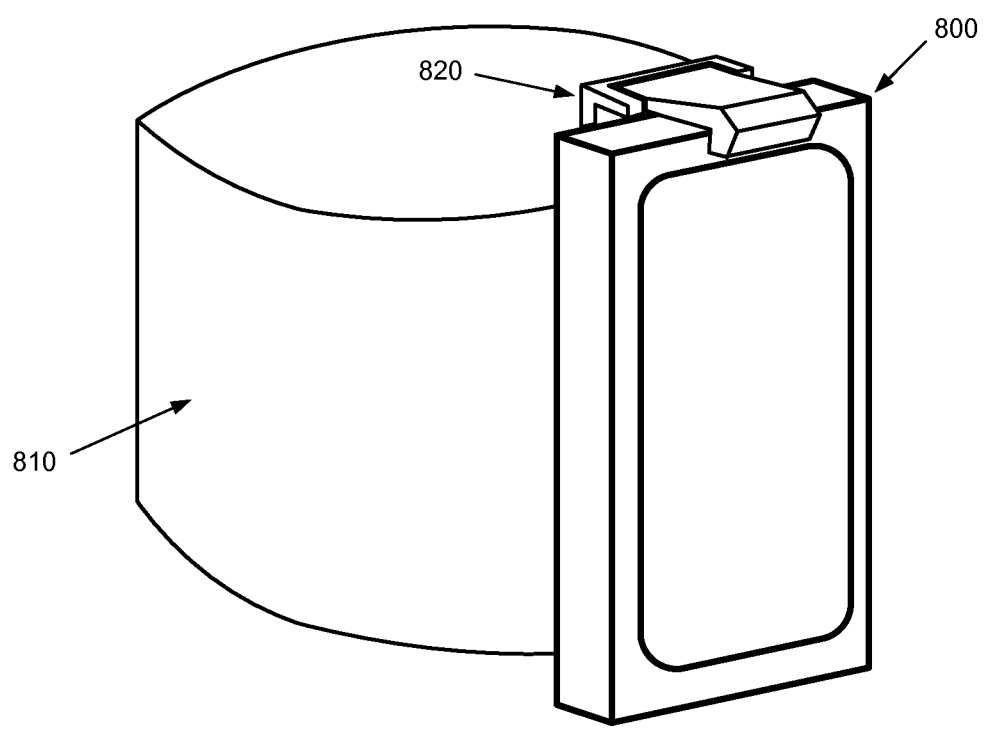
FIG. 8

ARMBAND BASED SYSTEMS AND METHODS FOR CONTROLLING WELDING EQUIPMENT USING GESTURES AND LIKE MOTIONS

CLAIM OF PRIORITY

This application is a continuation-in-part (CIP) of, and claims priority from U.S. patent application Ser. No. 14/502,599, filed Sep. 30, 2014. The above identified application is hereby incorporated herein by reference in its entirety.

BACKGROUND

Welding is a process that has increasingly become ubiquitous in all industries. Welding can be performed in automated manner or in manual manner. In particular, while welding may be automated in certain contexts, a large number of applications continue to exist where manual welding operations are used (e.g., where a welding operator uses a welding gun or torch to perform the welding). In either mode (automated or manual), the success of welding operations relies heavily on proper use of the welding equipment, e.g., success of manual welding depends on proper use of a welding gun or torch by a welding operator. For instance, improper torch angle, contact-tip-to-work-distance, travel speed, and aim are parameters that may dictate the quality of a weld. Even experienced welding operators, however, often have difficulty weld monitoring and maintaining these important parameters throughout welding processes.

BRIEF SUMMARY

Various implementations of the present disclosure are directed to armband based systems and methods for controlling welding equipment using gestures and like motions, substantially as illustrated by or described in connection with at least one of the figures, as set forth more completely in the claims.

BRIEF DESCRIPTION OF THE DRAWINGS

FIG. 8 shows an example gesture-based armband device for use in remotely controlling welding operations, in accordance with aspects of this disclosure.

DETAILED DESCRIPTION

Figure 1:
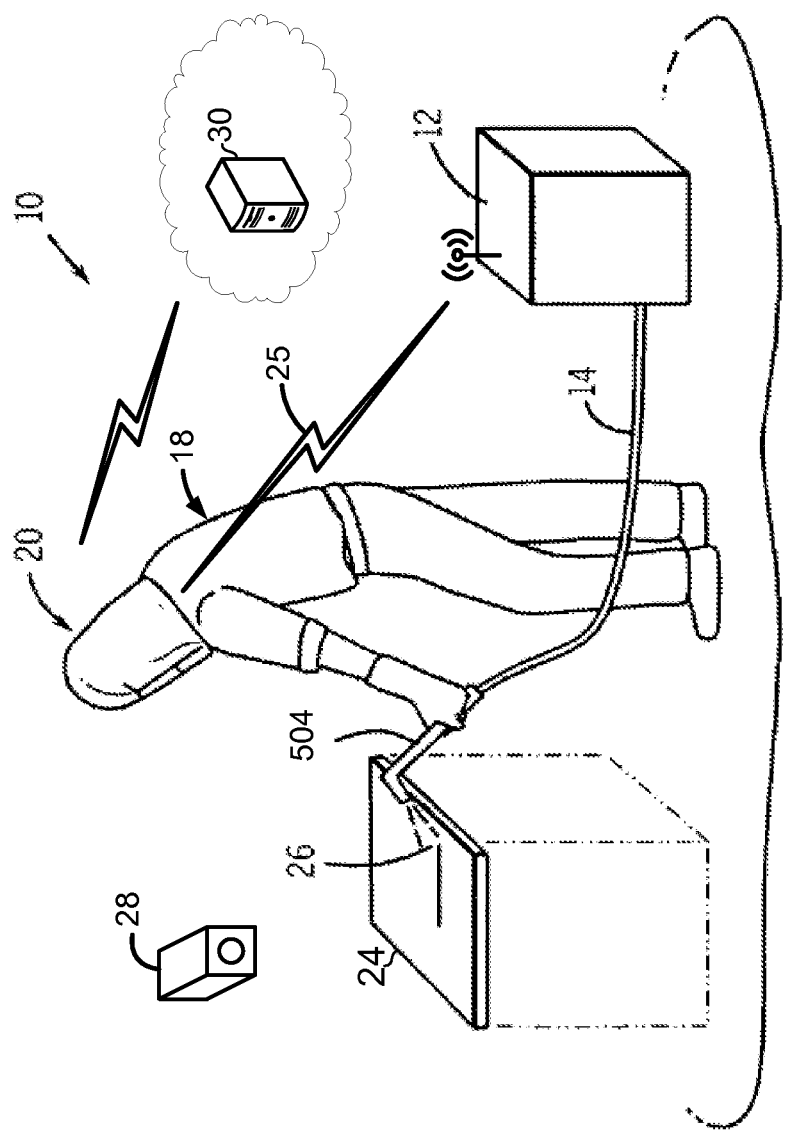
FIG. 1 shows an example arc welding system in accordance with aspects of this disclosure.

FIG. 1 shows an example arc welding system in accordance with aspects of this disclosure. Referring to FIG. 1, there is shown an example welding system 10 in which an operator 18 is wearing welding headwear 20 and welding a workpiece 24 using a torch 504 to which power is delivered by equipment 12 via a conduit 14, with weld monitoring equipment 28 being available for use to monitor welding operations. The equipment 12 may comprise a power source, optionally a source of an inert shield gas and, where wire/filler material is to be provided automatically, a wire feeder.

The welding system 10 of FIG. 1 may be configured to form a weld joint 512 by any known technique, including electric welding techniques such shielded metal arc welding (i.e., stick welding), metal inert gas welding (MIG), tungsten inert gas welding (TIG), and resistance welding.

Optionally in any embodiment, the welding equipment 12 may be arc welding equipment that provides a direct current (DC) or alternating current (AC) to a consumable or non-consumable electrode 16 (better shown, for example, in FIG. 5C) of a torch 504. The electrode 16 delivers the current to the point of welding on the workpiece 24. In the welding system 10, the operator 18 controls the location and operation of the electrode 16 by manipulating the torch 504 and triggering the starting and stopping of the current flow. When current is flowing, an arc 26 is developed between the electrode and the workpiece 24. The conduit 14 and the electrode 16 thus deliver current and voltage sufficient to create the electric arc 26 between the electrode 16 and the workpiece. The arc 26 locally melts the workpiece 24 and welding wire or rod supplied to the weld joint 512 (the electrode 16 in the case of a consumable electrode or a separate wire or rod in the case of a non-consumable electrode) at the point of welding between electrode 16 and the workpiece 24, thereby forming a weld joint 512 when the metal cools.

Optionally in any embodiment, the weld monitoring equipment 28 may be used to monitor welding operations. The weld monitoring equipment 28 may be used to monitor various aspects of welding operations, particularly in real-time (that is as welding is taking place). For example, the weld monitoring equipment 28 may be operable to monitor arc characteristics such as length, current, voltage, frequency, variation, and instability. Data obtained from the weld monitoring may be used (e.g., by the operator 18 and/or by an automated quality control system) to ensure proper welding.

As shown, and described more fully below, the equipment 12 and headwear 20 may communicate via a link 25 via which the headwear 20 may control settings of the equipment 12 and/or the equipment 12 may provide information about its settings to the headwear 20. Although a wireless link is shown, the link may be wireless, wired, or optical.

In some instances, the operator (e.g., operator 18) may need to interact with equipment used in welding operations and/or in weld monitoring of welding operations. For example, the operator 18 may need to interact with the welding equipment 12 and/or with the weld monitoring equipment 28, such as to control the equipment (e.g., adjust settings of the equipment), to obtain real-time feedback information (e.g., real-time equipment status, weld monitoring related information, etc.), and the like. In some use situations, however, the welding environment may impose certain limitations on possible solutions for interacting with the equipment used in conjunction with welding operations. For example, welding environments may be cluttered (e.g., with many equipment, cords or connectors, etc.), and/or may have spatial limitations (e.g., tight work space, awkward position or placement of workpieces, etc.). As a result, adding more devices into such environments to enable interacting with the welding or weld monitoring equipment may be undesirable, particularly when adding devices that require wired connectors. Use of such systems or devices, particularly ones that take too much space, may result in additional undesirable clutter and/or may take up valuable weld cell space. Further, use of wired connections or connectors (e.g., cords) may limit use distance for such devices (e.g., from power sources, from equipment that operator is trying to interact with, etc.), and may create safety problems (e.g., trip hazards).

Accordingly, in various embodiments in accordance with the present disclosure, small control devices, configured to utilize non-wired based solutions (e.g., wireless communication technologies; audio, video, and/or sensory input/output (I/O) solutions, etc.) may be used. For example, control devices implemented in accordance with the present disclosure may be small enough such that they can be worn by the operator, or integrated into equipment or clothing that the operator directly uses or wears during welding operations (e.g., welding helmets, welding gloves, etc.). For example, the devices may be small enough that they can be worn by the operator on or in a belt, an arm, a welding helmet, or welding gloves. Further, such control devices may be configured to support and use wireless technologies (e.g., WiFi or Bluetooth) to perform the communications necessary for the interfacing operations.

In certain embodiments, the control devices may use or support motion detection and recognition, to enable detecting and recognizing gestures or motions of operators. In particular, such control devices may be configured or programmed to recognize particular gestures by the operator, which the operator may perform when attempting to remotely interact with a particular piece of equipment in the welding environment (e.g., to remotely control that piece of equipment or to obtain data therefrom). In some instances these gestures may mimic the actions that the operator would perform when directly interacting with equipment. For example, the gesture or motion may comprise the operator mimicking the turning of a volume control knob, which when detected and interpreted as such may be communicated to the corresponding equipment to trigger a response by the equipment, as if the knob actually existed. This could remove the requirement for actual, physical interface, but still provide the desired control capability. The control devices may be implemented such that they may be affixed to a particular part of the operator's body or clothing worn by the operator. An example embodiment may comprise an elastic-like, and/or form-fitting arm band(s), such that it may be affixed to one of the operator's arms.

The motion detection and recognition may be performed using any solutions suitable for use in conjunction with welding arrangements in accordance with the present disclosure. Such solutions may comprise, for example, devices or components worn by the operator or integrated into equipment or clothing that the operator directly uses or wears during welding operations. For example, a detection component, which may be implemented as stand-alone device or as built-in component (e.g., of a control device), may be configured to detect gestures or motions of the operator. Further, a motion recognition component, which may be implemented as stand-along device or as built-in component (e.g., of a control device), may be configured to receive the detected gestures or motions, and to determine when/if detected gestures or motions correspond to particular user input (e.g., command). This may be done by comparing the detected gestures or motions against a predefined plurality of welding commands, each of which is associated with a particular gesture or motion. Thus, the motion recognition component identifies the welding command from the plurality of welding commands based on successful matching of the detected gesture or motion with a gesture or motion associated with a welding command, and transmits the identified welding command to a component of the welding system.

The motion detection and recognition function may be configurable and/or programmable. For example, in addition to normal mode of operation, where the motion recognition component is simply used to identify and trigger particular welding commands based on detected gestures or movement, the motion recognition component may also operate in "configuration" or "programing" mode. When operating in such configuration (or programing) mode the motion recognition component may receive one or more detected gestures or motions as well as a welding related command (e.g., provided by the operator using suitable means), and may associate the welding-related command with at least one of the detected gestures or motions, and stores the association for future comparison.

Figure 2:
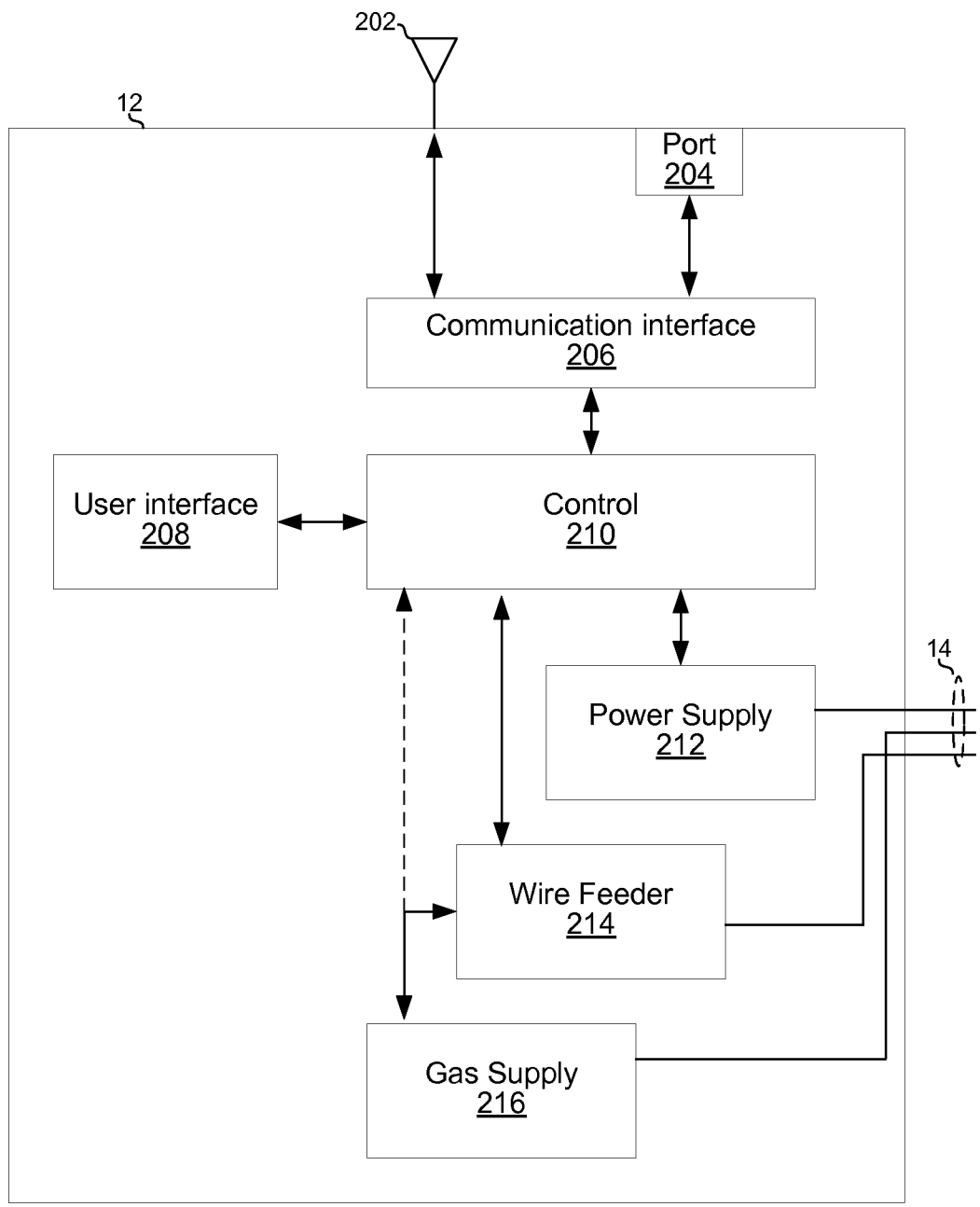
FIG. 2 shows example welding equipment in accordance with aspects of this disclosure.

FIG. 2 shows example welding equipment in accordance with aspects of this disclosure. The equipment 12 of FIG. 2 comprises an antenna 202, a communication port 204, communication interface circuitry 206, user interface module 208, control circuitry 210, power supply circuitry 212, wire feeder module 214, and gas supply module 216.

The antenna 202 may be any type of antenna suited for the frequencies, power levels, etc. used by the communication link 25.

The communication port 204 may comprise, for example, an Ethernet over twisted pair port, a USB port, an HDMI port, a passive optical network (PON) port, and/or any other suitable port for interfacing with a wired or optical cable.

The communication interface circuitry 206 is operable to interface the control circuitry 210 to the antenna 202 and/or port 204 for transmit and receive operations. For transmit, the communication interface 206 may receive data from the control circuitry 210 and packetize the data and convert the data to physical layer signals in accordance with protocols in use on the communication link 25. For receive, the communication interface may receive physical layer signals via the antenna 202 or port 204, recover data from the received physical layer signals (demodulate, decode, etc.), and provide the data to control circuitry 210.

The user interface module 208 may comprise electromechanical interface components (e.g., screen, speakers, microphone, buttons, touchscreen, etc.) and associated drive circuitry. The user interface 208 may generate electrical signals in response to user input (e.g., screen touches, button presses, voice commands, etc.). Driver circuitry of the user interface module 208 may condition (e.g., amplify, digitize, etc.) the signals and them to the control circuitry 210. The user interface 208 may generate audible, visual, and/or tactile output (e.g., via speakers, a display, and/or motors/actuators/servos/etc.) in response to signals from the control circuitry 210.

The control circuitry 210 comprises circuitry (e.g., a microcontroller and memory) operable to process data from the communication interface 206, the user interface 208, the power supply 212, the wire feeder 214, and/or the gas supply 216; and to output data and/or control signals to the communication interface 206, the user interface 208, the power supply 212, the wire feeder 214, and/or the gas supply 216.

The power supply circuitry 212 comprises circuitry for generating power to be delivered to a welding electrode via conduit 14. The power supply circuitry 212 may comprise, for example, one or more voltage regulators, current regulators, inverters, and/or the like. The voltage and/or current output by the power supply circuitry 212 may be controlled by a control signal from the control circuitry 210. The power supply circuitry 212 may also comprise circuitry for reporting the present current and/or voltage to the control circuitry 210. In an example implementation, the power supply circuitry 212 may comprise circuitry for measuring the voltage and/or current on the conduit 14 (at either or both ends of the conduit 14) such that reported voltage and/or current is actual and not simply an expected value based on calibration.

The wire feeder module 214 is configured to deliver a consumable wire electrode 16 to the weld joint 512. The wire feeder 214 may comprise, for example, a spool for holding the wire, an actuator for pulling wire off the spool to deliver to the weld joint 512, and circuitry for controlling the rate at which the actuator delivers the wire. The actuator may be controlled based on a control signal from the control circuitry 210. The wire feeder module 214 may also comprise circuitry for reporting the present wire speed and/or amount of wire remaining to the control circuitry 210. In an example implementation, the wire feeder module 214 may comprise circuitry and/or mechanical components for measuring the wire speed, such that reported speed is actual value and not simply an expected value based on calibration.

The gas supply module 216 is configured to provide shielding gas via conduit 14 for use during the welding process. The gas supply module 216 may comprise an electrically controlled valve for controlling the rate of gas flow. The valve may be controlled by a control signal from control circuitry 210 (which may be routed through the wire feeder 214 or come directly from the control 210 as indicated by the dashed line). The gas supply module 216 may also comprise circuitry for reporting the present gas flow rate to the control circuitry 210. In an example implementation, the gas supply module 216 may comprise circuitry and/or mechanical components for measuring the gas flow rate such that reported flow rate is actual and not simply an expected value based on calibration.

Figure 3:
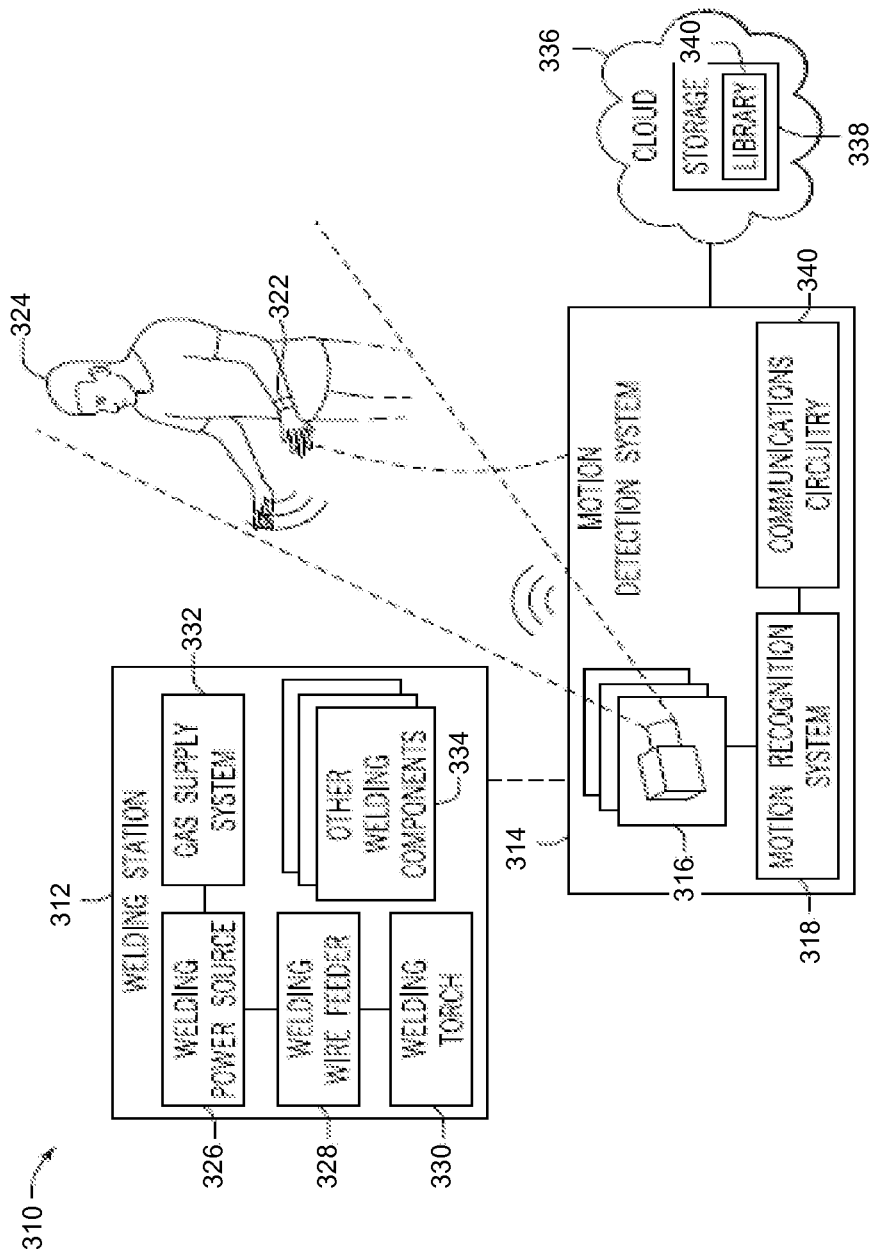
FIG. 3 is a block diagram illustrating an example use of a motion detection system operating within a welding system, in accordance with aspects of the present disclosure.

FIG. 3 is a block diagram illustrating an example use of a motion detection system operating within a welding system, in accordance with aspects of the present disclosure. Shown in FIG. 3 is a gesture-based welding arrangement 310, implemented in accordance with an example embodiment, comprising a welding system 312 and a motion detection system 314.

The motion detection system 314 may comprise detection circuitry 316, a motion recognition system 318, and communications circuitry 320. In certain embodiments, the detection circuitry 316 may comprise an accessory device 322 (e.g., sensors, accelerometers, computing devices, tags, etc. which may be incorporated into a worn device or clothing article) which may be remote from the motion detection system 314, such as disposed on or near a welding operator 324, but may communicate with the motion detection system 314 via wired or wireless systems. As noted above, the motion detected by the motion detection system 314 is translated into one or more command signals that the welding system 312 utilizes to change a welding operating parameter.

The detection circuitry 316 (e.g., sensor system) may comprise one or more cameras or a sensor system that may detect gestures and/or movements of the welding operator 324. It should be noted that in some situations, the detection circuitry 316 may comprise the accessory device 322. Further, the detection circuitry 316 may be configured to detect the motion of the accessory device 322. For example, the detection circuitry 316 may capture the movement of a sensor disposed within the accessory device 322. In other situations, the detection circuitry 316 directly detects the gestures and/or movements of the welding operator 324 without the intermediary accessory device 322. For example, the detection circuitry 316 may identify the welding operator and capture the movements of the welding operator (e.g., movement of the welding operator's joints, appendages, etc.). Further, in some situations, the detection circuitry 316 receives motion information from the accessory device 322, which is used to detect the gestures and/or movements of the welding operator 324. For example, the accessory device 322 may detect the movements of the welding operator, such as a blinking of the eye or a pinching of the fingers, and may process and communicate the detected movements to the motion detection system 314.

Accordingly, the detection circuitry 316 may incorporate various types of audio/video detection technologies to enable it to detect the positions, movements, gestures, and/or motions of the welding operator 324. For example, the detection circuitry 316 may comprise digital cameras, video cameras, infrared sensors, optical sensors (e.g., video/camera), radio frequency energy detectors, sound sensors, vibration sensors, heat sensors, pressure sensors, magnetic sensors, and the like to detect the positions and/or movements of the welding operator 324 and/or to detect the motion of the accessory device 322. Likewise, any of these audio/video detection technologies may also be incorporated into the accessory device 322.

In certain embodiments, the cameras (e.g., digital, video, etc.) may be incorporated with motion-detection components that are triggered by motion, heat, or vibration, and that may be used to detect the motion of the welding operator 324 or the accessory device 322. In certain embodiments, infrared sensors may be utilized to measure infrared light radiating from the welding operator 324 or the accessory device 322 to determine or detect gestures or motions. Further, other types of sensors (e.g., heat, vibration, pressure, sound, magnetic, etc.) may be utilized to detect heat, vibrations, pressures, sounds, or a combination thereof to determine or detect gestures or motions of the welding operator 324 or the accessory device 322. It should be noted that in certain embodiments, a plurality of sensors may be positioned in a variety of locations (on or disposed remote from the motion detection system 314) to determine these parameters, and thereby the motion of the welding operator 324 or the accessory device 322, with greater accuracy. Further, it should be noted that one or more different types of sensors may be incorporated into the detection circuitry 316. For example, a heat sensor may be configured to detect motion of the welding operator 324 or the accessory device 322. In certain embodiments, radio frequency energy sensors may be utilized to detect the motion of the welding operator 324 or the accessory device 322 via radar, microwave, or tomographic motion detection.

The detected positions, gestures, and/or motions received by detection circuitry 316 may be input into the motion recognition system 318 which may translate the detected motions into various welding commands that correspond to the detected motions. After determining the welding command that corresponds to the detected motions, the motion recognition system 318 may send the welding command to the welding system 312 via the communications circuitry 320. The welding system 312, or more particularly, a component of the welding system 312, may implement the welding command. For example, the motion recognition system 318 may receive a detected motion from the detection circuitry 316 and may interpret the detected motion as a command to stop the function of a component of the welding system 312. Further, the communications circuitry 320 may send a signal to the welding system 312 to stop the component of the welding system 312, as desired by the welding operator 324.

The welding system 312 may comprise various components that can receive the control command signals. The systems and methods described herein may be utilized with a gas metal arc welding (GMAW) system, other arc welding processes (e.g., FCAW, FCAW-G, GTAW (TIG), SAW, SMAW), and/or other welding processes (e.g., friction stir, laser, hybrid). For example, in the illustrated embodiment, the welding system 312 may comprise a welding power source 326, a welding wire feeder 328, a welding torch 330, and a gas supply system 332. However, it should be noted that in other embodiments, various other welding components 334 can receive the control command signals from the motion detection system 314.

The welding power supply unit 326 generally supplies power to the welding system 312 and other various accessories, and may be coupled to the welding wire feeder 328 via a weld cable. The welding power supply 326 may also be coupled to a workpiece (not illustrated) using a lead cable having a clamp. In the illustrated embodiment, the welding wire feeder 328 is coupled to the welding torch 330 via a weld cable in order to supply welding wire and power to the welding torch 330 during operation of the welding system 312. In another embodiment, the welding power supply 326 may couple and directly supply power to the welding torch 330. The welding power supply 326 may generally comprise power conversion circuitry that receives input power from an alternating current power source 454 (e.g., the AC power grid, an engine/generator set, or a combination thereof), conditions the input power, and provides DC or AC output power. As such, the welding power supply 326 may power the welding wire feeder 328 that, in turn, powers the welding torch 330, in accordance with demands of the welding system 312. The illustrated welding system 312 may comprise a gas supply system 332 that supplies a shielding gas or shielding gas mixtures to the welding torch 330.

During the welding processes, a variety of control devices are often provided to enable an operator to control one or more parameters of the welding operation. For example, in some welding systems 312, a control panel is provided with various knobs and buttons that enable the welding operator to alter the amperage, voltage, or any other desirable parameter of the welding process. Indeed, the welding operator may control a wide variety of welding parameters on one or more components of the welding system 312 (e.g., voltage output, current output, a wire feed speed, pulse parameters, etc.). Accordingly, a wide variety of welding parameters may be controlled via detected positions, gestures, and/or motions received by detection circuitry 316, and translated into various welding commands via the motion recognition system 318.

For example, a welding operator may wish to adjust the speed of the wire feed from the weld location. Accordingly, the welding operator may gesture a preset motion that the motion detection system 314 will detect, recognize, and translate into a command for adjusting the wire feed speed. Further, the welding system 312 receives the command, and implements the command to adjust the wire feed speed as desired. In some situations, the operator may implement several successive gestures for a series of commands that operate the welding system 312 in a desired manner. For example, to adjust a voltage output of the welding system 312, the operator may first provide a gesture that is associated with the welding power source 326, and that is indicative of wanting to control a feature of the welding power source 326. Next, the operator may gesture to increase or decrease the voltage output of the welding system 312. In some situations, the motion detection system 312 may translate and store each welding command before communicating the final welding command to the welding system 312. In other situations, the motion detection system 312 may communicate each welding command directly to the welding system 312. Further still, in some embodiments, the motion detection system 312 may receive only one welding command, but may interpret the welding command into one or more control signals. Accordingly, one or more successive control signals may be implemented by the welding system 312, where each control signal is one step of the received welding command.

As noted above, in certain embodiments, the motion detection system 314 is coupled to a cloud network 336 having a storage 338 that may comprise a library 440 of gestures associated with a particular welding command and/or a type of welding command. In particular, the motion recognition system 318 may utilize the cloud 336 to determine one or more welding commands based on motion detected by the detection circuitry 316. The cloud 336 may refer to various evolving arrangements, infrastructure, networks, and the like that are typically based upon the Internet. The term may refer to any type of cloud, including a client clouds, application clouds, platform clouds, infrastructure clouds, server clouds, and so forth. As will be appreciated by those skilled in the art, such arrangements will generally allow for a various number of entities to receive and store data related to welding applications, transmit data to welders and entities in the welding community for welding applications, provide software as a service (SaaS), provide various aspects of computing platforms as a service (PaaS), provide various network infrastructures as a service (IaaS) and so forth. Moreover, included in this term should be various types and business arrangements for these products and services, including public clouds, community clouds, hybrid clouds, and private clouds. In particular, the cloud 336 may be a shared resource accessible to various number of welding entities, and each welding entity (e.g., operator, group of operators, company, welding location, facility, etc.) may contribute welding gestures associated with welding commands, which may be utilized by the motion recognition system 318 at a later time.

In an example embodiment, multiple motion detection components or elements may be used to enhance motion detection and/or interfacing based thereon. For example, with reference to the welding arrangement 310 depicted in FIG. 3, rather than using only a single accessory device 322, multiple accessory devices 322 may be used. Where the accessory device 322 is an armband based device, for example, the operator may wear an accessory device 322 on each arm. The use of multiple motion detection devices (or elements) may allow detecting (and thus recognizing based thereon) more complex gestures or movements (e.g., complex three-dimensional (3D) gestures or movements). The use of multiple motion detection devices (or elements) may also allow the operator to provide the gesture-based input using any of the available devices, thus enabling the operator more freedom with respect to how to perform the welding. For example, when wearing an armband-based detection device on each arm the operator may switch welding equipment (e.g., torch) between hands still have a free arm/hand to continue interfacing (e.g., controlling selected parameters) without having to move the sensor band between wrists. Further, the motion detection device (or element) may be configured to accommodate such flexible operation, e.g., being operable to recognize which arm the operator is wearing the device on, such as based on the execution of a particular gesture that indicate whether the device is actively being used (or not) in providing gesture-based input.

Figure 4:
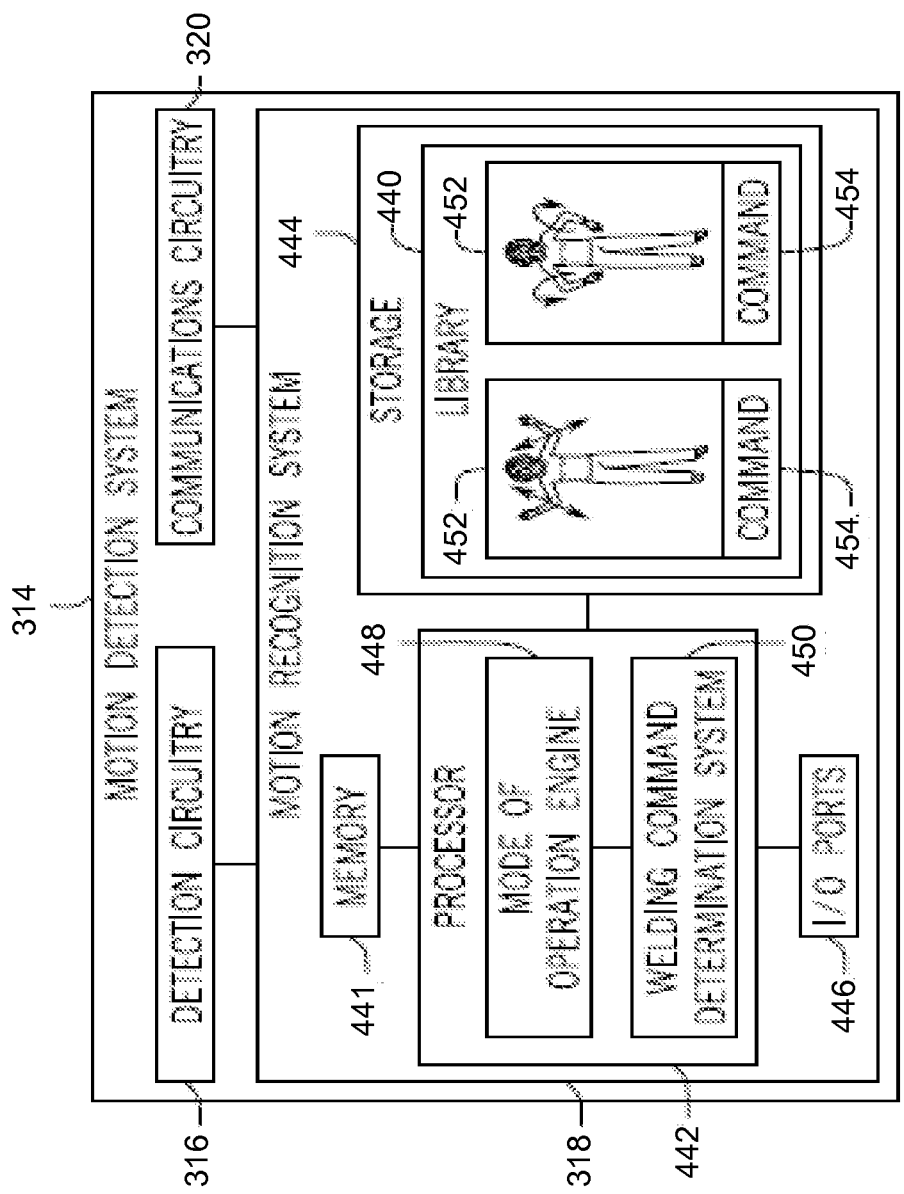
FIG. 4 is a block diagram illustrating an example motion detection system, in accordance with aspects of the present disclosure.

FIG. 4 is a block diagram illustrating an example motion detection system, in accordance with aspects of the present disclosure. Shown in FIG. 4 is the motion detection system 314, which may comprise the detection circuitry 316, the motion recognition system 318, and the communications circuitry 320.

As noted above, the detection circuitry 316 may comprise may incorporate various types of audio/video detection technologies to enable it to detect the positions, movements, gestures, and/or motions of the welding operator 324 and/or the accessory device 322. Further, the communications circuitry 320 enables wired or wireless communications between the motion detection system 314 and the cloud 336, the welding system 312, and/or the accessory device 322. The motion detection system 314 also may comprise a memory 441, a processor 442, a storage medium 444, input/output (I/O) ports 446, and the like. The processor 442 may be any type of computer processor or microprocessor capable of executing computer-executable code. The memory 441 and the storage 444 may be any suitable articles of manufacture that can serve as media to store processor-executable code, data, or the like. These articles of manufacture may represent computer-readable media (i.e., any suitable form of memory or storage) that may store the processor-executable code used by the processor 442 to perform the presently disclosed techniques.

The motion recognition system 318 may receive motion and/or gesture data related to the welding operator 324 and/or the accessory device 322 via wired and/or wireless communications. In particular, the motion recognition system 318 interprets the received data to determine the welding commands (e.g., welding control signals) for one or more components of the welding system 312. The memory 441 and the storage 444 may also be used to store the data, the respective interpretation of the data, and the welding command that corresponds to the data within the library 440. The illustrated embodiment depicts the storage 444 of the motion recognition system 318 storing information related to the data and the welding command corresponding to the data (as further described below), but it should be noted that in other embodiments, the memory 441 and/or the cloud 336 (as described with respect to FIG. 3) may be utilized to store the same information.

The library 440 may comprise a particular type of motion and/or a particular motion (e.g., gesture) and a welding command associated with that motion or type of motion. In some situations, a mode of operation engine 448 within the processor 442 of the motion recognition system 318 may be utilized to change the mode of operation of the motion recognition system 318. The mode of operation engine 448 may be set to, for example, an operating mode or a configuration mode. For example, in the configuration mode, the motion recognition system 318 is programmed to associate a particular motion or gesture with a particular welding command. As such, the operator 324 may provide an input to the motion recognition system 318 via the I/O ports 446 indicating a welding command for a particular component of the welding system 312. The welding operator 324 may then position himself in a manner that allows the detection circuitry 316 to detect the particular motion or gestures that the operator 324 intends to be associated with the inputted welding command. In particular, the motion recognition system 318 may store the pattern of motion and/or the gesture collected by the detection circuitry 316 within the library 440, and may associate the motion with the respective welding command.

For example, the operator 324 may provide an input to the motion recognition system 318 to enter into the configuration mode and associate a particular motion or gesture with a particular welding command for a particular component of the welding system 312, such as the welding power source 326. After receiving these inputs, the motion recognition system 318 may detect the gestures of the operator 324 such as, for example, holding one arm out straight with a palm out and figures up, while the operator 324 is in the view window of detection circuitry 316. In some embodiments, the operator 324 need not within the view of the detection circuitry 316, but may be wearing the accessory device 322 which may comprise one or more sensors (e.g., accelerometers) that tracks the motion of the operator 324 and communicates the motion to the detection circuitry 316. In other embodiments, the detection circuitry 316 may be configured to track the movement of the accessory device 322 from the motion recognition system 318, and more specifically, may be tracking the movement of the accessory device 322 and/or one or more sensors disposed within the accessory device 322. Once the motion recognition system 318 detects the motion, the motion recognition system 318 may store the motion and/or gestures as data within the gesture library 440. In particular, the data is associated with the welding command or task, and may be tagged as such within the storage 444 and/or memory 441. In this manner, for example, the operator 324 may configure an upwards motion of the palm of the hand as an gesture associated with increasing the wire speed of the welding system 312. In certain embodiments, the motion recognition system 318 may enter and exit the configuration mode by receiving some input from the operator 324 that does not comprise any detected motion or gesture. In this case, the configuration mode may be secure and may not be compromised by any inadvertent motions or gestures.

In certain embodiments, the mode of operation engine of the processor 442 of the motion recognition system 318 is set to an operating mode. In the operating mode, the welding operator 324 may be performing a welding task with the welding system 312, and may have the motion detection system 314 enabled. During the welding process, the operator 324 may wish to adjust a welding parameter via one or more gestures or motion. Accordingly, the detection circuitry 316 receives the gesture and/or motion in one of the methods described above, and the welding command is re-tried from the library 440 based on the detected gestures and/or motions of the operator 324 (or the accessory device 322). For example, if the motion recognition system 318 detects that the operator 324 is moving the palm of her hand in an upwards motion, the motion recognition system 318 may compare the detected motion to the motions or patterns of motion stored in the library 440 and determine that the motion corresponds to increasing the wire speed of the welding system 312.

In an example embodiment, the motion detection system 314 may support gestures for disabling (and/or enabling) gesture-based functions. For example, the library 440 may comprise an association between particular gesture (or movement) and a command for disabling the motion detection system 314, and the mode of operation engine 448 may support a non-operating mode. As such, when the operator 324 executes the particular gesture, and the gesture is detected by the accessory device 322 and is then recognized by the detection circuitry detection circuitry 316, the disabling command may be issued and executed. Disabling the motion detection system 314 may be done by powering off the system. Further, before the motion detection system 314 is powered off, notifications may be generated and communicated to other systems that are interacting with the motion detection system 314, such as the welding system 312, to ensure that the system(s) take necessary steps to account for the motion detection system 314 being powered off.

Where the disabling comprises powering off the motion detection system 314, (re)enabling the motion detection system 314 may require manually or directly (re)powering on the system. In other instances, however, disabling the motion detection system 314 may simply comprise shutting down various components and/or functions therein, and transitioning to a minimal-function state, where only functions and/or components required for re-enabling the motion detection system 314 remain running. Thus, when an enabling gesture (which may be the same as the disabling gesture) is detected via the accessory device 322, the gesture may trigger re-enabling or re-activating the motion detection system 314 into full operation mode. Transitioning to such minimum functionality states may improve power consumption (as many functions and/or components are shut down or powered off) without affecting the ability to resume motion detection related operations when needed (and do so quickly). In some implementations, the motion detection system 314 (and/or other components or devices used to support the gesture-related operations) may be configured to account for disabling and/or deactivating the system, by providing other suitable for the (re)enabling of the system. For example, where the detection is optical based using optical components or elements (e.g., camera), and the optical components or elements are disabled as part of the overall disabling of the detection operations, then the re-enabling may be configured or implemented such that it may be triggered by the user by something other than visually recognizing gestures. Examples of such non-visual means may comprise button/control, sensors that may sense (rather than visually perceive) movement of the user. In other words, such visually-based motion detection systems may be configured to supplement remote gesture detection with local (on-person) gesture detection elements for detection re-enabling gestures.

The library 440 may comprise a plurality of motions 452 and a corresponding welding command 454 for each motion. The welding commands may include any command to control the welding system 312, and/or components of the welding system 312, such as the welding power source 326, the gas supply system 332, the welding wire feeder 328, the welding torch 330, or other welding components 334 (e.g., grinders, lights, etc.) of the welding system 312. As such, the welding commands may include, but are not limited to, starting a device, stopping a device, increasing a speed or output of a device, decreasing a speed or output of a device, and the like. For example, welding commands related to the gas supply system 332 may include adjusting a gas flow rate. Likewise, welding commands related to the welding wired feeder 328 may include adjusting a welding wire speed, changing between push/pull feeding system, and the like. Further, welding commands related to the welding power source 326 may include varying a voltage or power routed to the welding torch 330. Moreover, the library 440 may include other commands associated with various motions such as disabling the motion recognition system 318, limiting the control or ability of an operator to engage with the motion recognition system 318, or the like.

Figure 5:
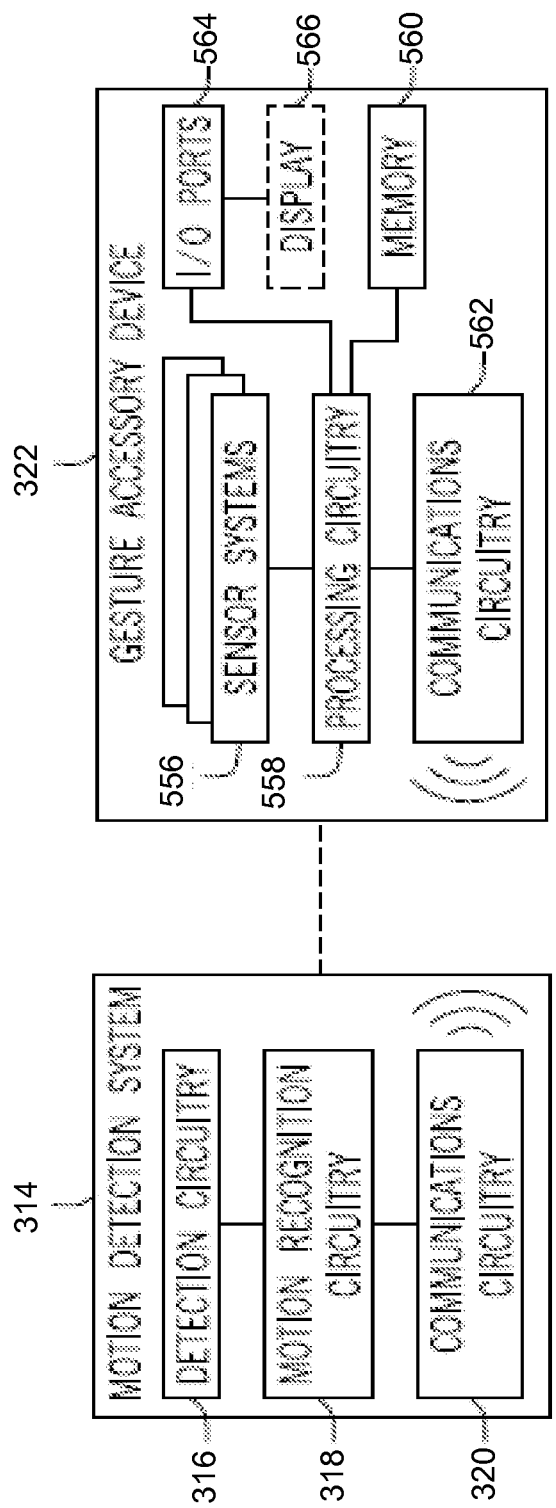
FIG. 5 is a block diagram illustrating an example gesture accessory device that may be used in conjunction with motion detection systems, communicating therewith wirelessly, in accordance with aspects of the present disclosure.

FIG. 5 is a block diagram illustrating an example gesture accessory device that may be used in conjunction with motion detection systems, communicating therewith wirelessly, in accordance with aspects of the present disclosure. Shown in FIG. 5 is the motion detection system 314 being operatively coupled to the accessory device 322 in accordance with an example embodiment. In this regard, in various embodiments the accessory device 322 may be in wired or wireless communication with the motion detection system 314.

In some embodiments, the detection circuitry 316 may comprise the accessory device 322. Further, the detection circuitry 316 may be configured to directly track the movement of the accessory device 322 and/or one or more sensors disposed within the accessory device 322 from the motion detection system 314. Specifically, the accessory device 322 may comprise sensors 556 (e.g., infrared, optical, sound, magnetic, vibration, etc.), accelerometers, computing devices, smart phones, tablets, GPS devices, wireless sensor tags, one or cameras, or the like that are configured to aid the detection circuitry 316 in detecting the motion and/or gestures of the operator 324. In some situations, the accessory device 322 may be incorporated into a clothing article that is worn, disposed, or carried by the operator 324 (e.g., bracelet, wristlet, anklet, necklace, etc.), or may be a device that is held by the operator 324.

In some situations, the sensor systems 556 are configured to gather gesture and/or motion data from the operator 324, similar in manner to the detection circuitry 316. The motion and/or gesture data gathered may be digitized via one or more processors within processing circuitry 558, which may also be associated with a memory 560. The processing circuitry 558 may be any type of computer processor or microprocessor capable of executing computer-executable code. The memory 560 may be any suitable articles of manufacture that can serve as media to store processor-executable code, data, or the like. These articles of manufacture may represent computer-readable media (i.e., any suitable form of memory or storage) that may store the processor-executable code used by the processing circuitry to perform the presently disclosed techniques. Further, the digitized data may be communicated via wired and/or wireless communications circuitry 562 to the motion detection system 314. As noted above, the motion recognition system 318 interprets the received data to determine the welding commands (e.g., welding control signals) for one or more components of the welding system 312, and transfers the welding commands to the welding system 312 via the communications circuitry 320 of the motion detection system 314. It should be noted that the communications between the components of the gesture-based welding arrangement 310 might be over secure channels.

In some embodiments, the communications circuitry 562 of the gesture accessory device 322 also communicates with the welding system 312. For example, the gesture accessory device 322 may be paired with the welding device 322 before welding operations are commenced, to ensure that the gestures provided by the operator 324 are securely intended for the paired devices. In this manner, though a plurality of gesture accessory devices 322 are proximate to the welding system 312, only the paired device 322 is able to provide gesture commands to the welding system 312 via the motion detection system 314.

Further, in some embodiments, the accessory device 322 may comprise I/O ports 564 that may enable the operator 324 to provide inputs to the motion detection system 314. The inputs may comprise methods to pair the accessory device 322 with the welding system 312 and/or the motion detection system 314, and may also be utilized by the operator 324 to input identification information and/or welding related information. In some embodiments, the accessory device 322 may comprise a display 566 that enables an operator 324 to visualize the welding commands sent by the motion detection system 314 to the welding system 312. Further, the display 566 may be utilized to receive and display various welding related information from the welding system 312, such the status of the current operating parameters, the status of welding commands (e.g., control signals) sent to the welding system 312, the status of a wireless connection, whether or not the welding commands were implemented, error or alerts, or generally any information related to the gesture-based welding arrangement 310.

In some embodiments, non-visual feedback may be used during gesture-based interactions (e.g., control) of welding operations to allow for feedback to the operator in non-visual manner, e.g., without requiring the operator to use the display or similar visual interfaces which would result in the operator taking his/her eyes off the workpiece(s) being welded. For example, the accessory device 322 may be configured to provide feedback to the operator with respect to gesture-based interaction (e.g., control) of welding operations using non-visual means such as audio (e.g., buzzer), haptic (e.g., vibration), or similar output. The feedback may, for example, acknowledge receipt of a particular gesture. For example, two long vibrations may indicate recognition of a "increase amperage" gesture, and one short vibration may indicate recognition of a "decrease amperage" gesture. The system may then, for example, wait for a second confirmatory gesture before putting the recognized gesture into effect.

Use of non-visual feedback may be particularly desirable where use of a display or visual output may be neither practical nor desirable (e.g., for safety reasons), or to obviate the need for any such display altogether. In armband-based implementations, for example, supporting non-visual feedback may allow wearing accessory device 322 in manner which would not be possible where feedback is provided visually, e.g., it may be worn underneath a welding jacket and thus be protected from the welding environment. Further, the use of non-visual feedback may be more desirable in welding operations as operators may not be able to clearly see visual feedback since the operator would be wearing specialized helmets/hoods and/or be looking at the display and trying to read the visual feedback through special welding lenses or glasses.

With non-visual feedback, characteristics of the utilized non-visual output may be adjusted to provide different feedback. For example, with vibration-based feedback, the vibration may be adjusted (e.g., in term in one or more of duration, frequency, and intensity of the vibration) to indicate different feedback. In some instances, characteristics of the non-visual output may be configured and/or adjusted by the operator to indicate particular feedback. For example, when implemented to provide non-visual feedback, I/O ports 564 of the accessory device 322 may be used to specify particular type of non-visual feedback (e.g., audio or vibration), and/or to specify particular characteristics (e.g., duration, frequency, and intensity of vibration) for each particular desired feedback.

While the accessory device 322 and the motion detection system 314 are illustrated and described as two separate elements in FIGS. 3-5, the disclosure need not be so limited. Accordingly, in an example embodiment, the accessory device 322 and the motion detection system 314 (and functions of them) may be combined into a single device, which may preferably be configured or designed for portable use in the same manner described with respect to the accessory device 322. As such, this single device would be operable to perform the functions of the accessory device 322 (e.g., gesture detection, sensory, input/output) as well as the function of the motion detection system 314 (e.g., motion recognition, command determination, command association, etc.).

Figure 6:
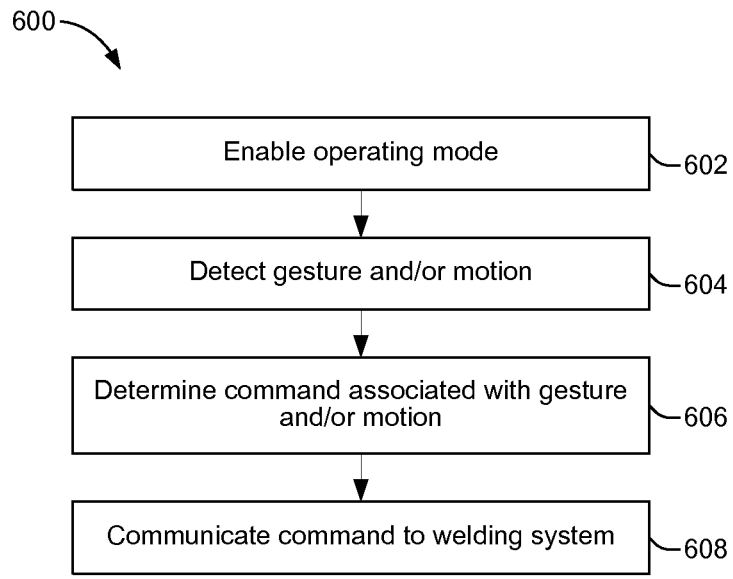
FIG. 6 is a flowchart illustrating an example method for communicating a welding command to a welding system from a motion detection system, in accordance with aspects of the present disclosure.

FIG. 6 is a flowchart illustrating an example method for communicating a welding command to a welding system from a motion detection system in accordance with aspects of the present disclosure. Shown in FIG. 6 is a flow chart of a method 600, comprising a plurality of example steps (represented as blocks 602-608), for communicating a welding command to the welding system 312 from the motion detection system 314 of FIG. 3 in accordance with an example embodiment.

The method 600 may be used in enabling an operating mode of the motion detection system 314 on the mode of operation engine 448 via the I/O ports 446 (step 602). In this manner, the motion detection system 314 may be configured to detect a motion and/or gesture and utilize the gesture library 440 to translate the detected motion and/or gesture into a welding command.

For example, the method 600 may comprise detecting the gesture and/or motion (step 604). As noted above, the detection circuitry 316 may comprise may incorporate various types of audio/video detection technologies to enable it to detect the positions, movements, gestures, and/or motions of the welding operator 324 and/or the accessory device 322. Further, the method 600 may comprise determining a welding command that is associated with the detected motion and/or gesture (step 606). For example, the motion recognition system 318 interprets the received data to determine the welding commands (e.g., welding control signals) for one or more components of the welding system 312. The welding command may be determined by comparing the received data with data within the gesture library 440.

In addition, the method 600 may comprise communicating the welding command to the welding system 312 (step 608). The welding commands may comprise any command to control the welding system 312, and/or components of the welding system 312, such as the welding power source 326, the gas supply system 332, the welding wire feeder 328, the welding torch 330, or other welding components 334 of the welding system 312. In this manner, the gesture and/or motion provided by the operator 324 and/or the accessory device 322 may be utilized to control one or more welding parameters of the welding system 312.

Figure 7:
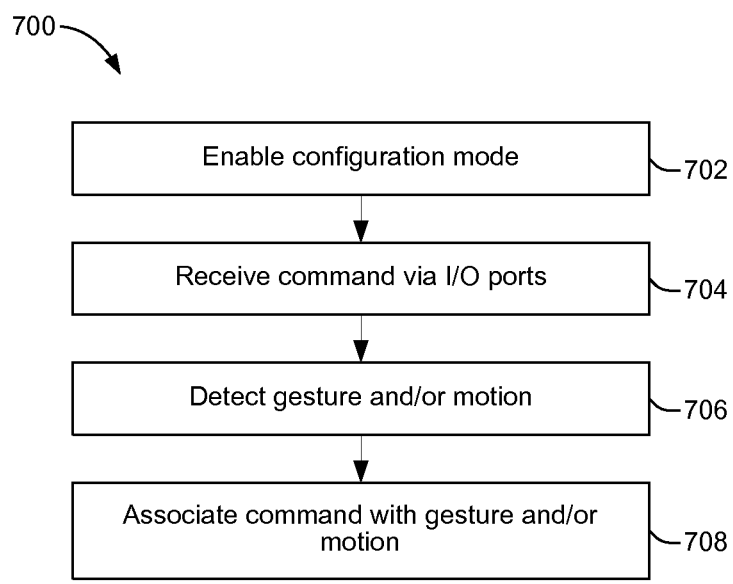
FIG. 7 is a flowchart illustrating an example method for associating a welding command with a particular gesture or motion, in accordance with aspects of the present disclosure.

FIG. 7 is a flowchart illustrating an example method for associating a welding command with a particular gesture or motion in accordance with aspects of the present disclosure. Shown in FIG. 7 is a flow chart of a method 700, comprising a plurality of example steps (represented as blocks 702-708) for associating a particular welding command with a particular gesture and/or motion in accordance with an example embodiment.

As noted above, the motion detection system 314 may be configured in an operating mode to detect a motion and/or gesture and utilize the gesture library 440 to translate the detected motion and/or gesture into a welding command. The illustrated method 700 includes enabling a configuration mode (e.g., learning, pairing, association, etc.) of the motion detection system 314 on the mode of operation engine 448 via the I/O ports 446 (step 702). In this manner, the motion detection system 314 may be configured to associate and store within the memory 441 and/or the storage 444 a particular motion or gesture with a particular welding command.

In addition, the method 700 may comprise the motion detection system 314 receiving a welding command that the operator 324 wishes to set a gesture and/or motion for via the I/O ports 446 (step 704). The welding command may be for any component of the welding system 312, as discussed above. The welding operator 324 may then position himself in a manner that allows the detection circuitry 316 of the motion detection system 318 to detect the particular motion or gestures that the operator 324 intends to be associated with the inputted welding command (step 706). Further, the method 700 may comprise the motion recognition system 318 storing the motion and/or the gesture collected by the detection circuitry 316 within the library 440, and associating the motion with the respective welding command (step 708). It should be noted that such associations may be made and stored within the library 440 of the cloud network 336, and retrieved by the local systems as desired. In some situations, the pre-associated global welding commands may be overwritten with local welding commands that are more personal to the welding operator 324.

FIG. 8 shows an example gesture-based armband device for use in remotely controlling welding operations in accordance with aspects of this disclosure. Shown in FIG. 8 is a gesture-based control device 800 that is worn by an operator (e.g., operator 18) during welding operations.

The gesture-based control device 800 may comprise suitable circuitry operable to support interacting with and controlling equipment used in welding operations and/or monitoring of welding operations. The gesture-based control device 800 may be configured such that it may be affixed to an operator (e.g., operator 18), and/or to an item worn by or directly handled by the operator (e.g., welding helmet, welding glove, welding torch, etc.). In the particular embodiment depicted in FIG. 8, the gesture-based control device 800 may be configured as an armband-based implementation. The gesture-based control device 800 may be operable to receive operator input, which is specifically provided in the form of gestures and/or movement. In this regard, the gesture-based control device 800 may be operable to detect gestures and/or motions by the operator, and then process the detected gestures and/or motions. The processing may comprise determining whether (or not) the detected gestures and/or motions correspond to particular command (or action(s)). For example, as described in more detail above (e.g., with respect to FIGS. 3-7), particular gestures and/or motions may be associated with specific welding commands, or with actions that may be performed or handled directly by the device itself (e.g., generating new associations for detected gestures and/or motions, disabling/(re-)enabling gesture/motion related components or operations, etc.). An example detailed embodiment of the components and circuitry of the device 800 is described in FIG. 9.

The gesture-based control device 800 may be configured to communicate with other devices or systems, such as when detected gestures or motions are determined to be associated with particular welding commands. The gesture-based control device 800 may preferably be operable to perform such communications wirelessly. In this regard, the gesture-based control device 800 may be operable to connect to other devices or systems (e.g., welding and/or weld monitoring equipment) wirelessly, e.g., by setting up and using connections based on suitable wireless technologies, such as WiFi, Bluetooth, etc.

The armband-based gesture-based control device 800 of FIG. 8 comprises an elastic band 810 (e.g., wrist band), which may allow the operator 18 to wear the gesture-based control device 800 on his/her arm (as shown in the top part of FIG. 8). In some instances, rather than the gesture-based control device 800 having a built-in band, a dedicated armband arrangement may be used instead. Such armband arrangement may comprise the band 810 and a holder 820 to which the gesture-based control device 800 may be attached. For example, the holder 820 may comprise suitable securing means (e.g., a clip), configured to secure the device 800 into the armband arrangement. Nonetheless, the disclosure is not so limited, and other approaches (and corresponding arrangements) may be used for wearing control devices by operators, or integrating them into clothing or equipment used or worn by the operators.

The gesture-based control device 800 may be configured to support non-visual based feedback. For example, the gesture-based control device 800 may be operable to support tactile feedback, such as vibration, or audio feedback. In this regard, the gesture-based control device 800 may comprise vibration and/or audio components, which may generate vibrations and/or audio signals as means of providing feedback. The vibration component may be operable to vary the frequency, amplitude, and duration of vibrations to provide different feedback, e.g., indicating recognition of certain gestures or validating that a corresponding action has taken place. This feedback would be detectible by the operator since the device is in intimate contact with the operator's arm. Similarly, the audio component (e.g., audio transducer) may provide feedback, e.g., by providing particular audio outputs (e.g., a particular one of a plurality of pre-defined ring tones, similar to the ones typically used in phones) with each being uniquely indicative of certain feedback.

The gesture-based control device 800 may be a dedicated device that is designed and implemented specifically for use in interacting with and controlling welding components (e.g., welding and/or weld monitoring equipment). In some example implementations, however, devices which may not be specifically designed or made as a "control device" may be nonetheless configured for use as such. In this regard, devices having capabilities and/or characteristics that may be necessary for functioning as a control device, in the manner described in the present disclosure, may be used. For example, devices that may be used include those having (1) suitable communicative capabilities (e.g., wireless technologies such as WiFi, Bluetooth, or the like), (2) suitable resources for detecting gestures and/or motions interactions (e.g., sensors), (3) suitable processing capabilities for processing and analyzing detected motions or gestures, or (4) suitable resources for providing feedback (e.g., keypads, buttons, textual interface, or touchscreens) that are also sufficiently small and/or light to be conveniently worn by the operator and/or integrated into the items worn or directly used by the operator. Also, devices such as smartphones, smartwatches, and the like may be used as "control devices." In this regard, the interfacing functions may be implemented in software (e.g., applications), which may run or be executed by the existing hardware components of these devices.

Figure 9:
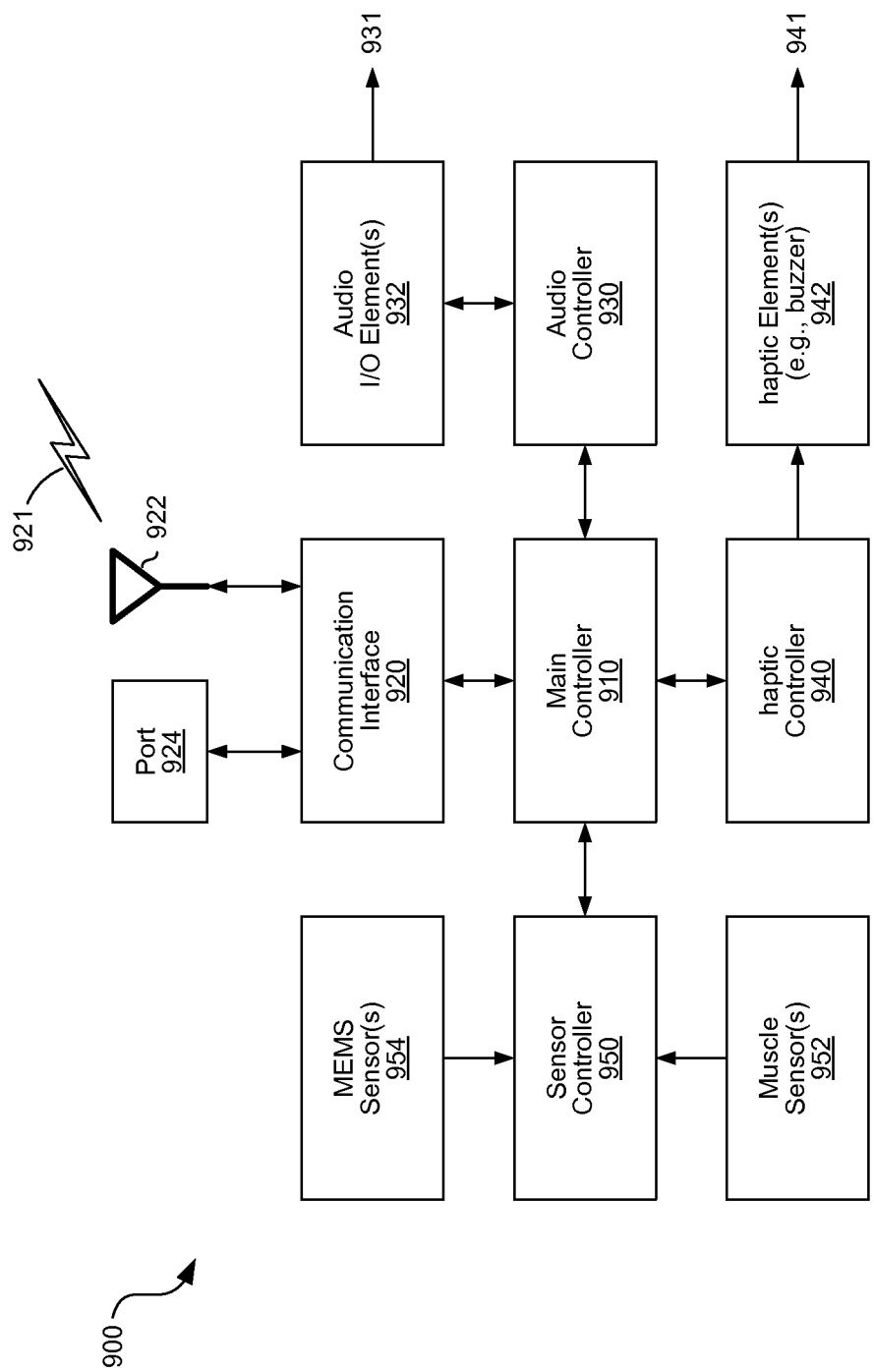
FIG. 9 shows example circuitry of a gesture-based armband device for use in remotely controlling welding operations, in accordance with aspects of this disclosure.

FIG. 9 shows example circuitry of a gesture-based armband device for use in remotely controlling welding operations in accordance with aspects of this disclosure. Shown in FIG. 9 is circuitry of an example gesture-based control device 900. The gesture-based control device 900 may correspond to the device 800 of FIG. 8.

As shown in FIG. 9, the gesture-based control device 900 may comprise a main controller (e.g., a central processing unit (CPU)) circuitry 910, a communication interface circuitry 920, an audio controller circuitry 930, a haptic controller circuitry 940, and a sensor controller circuitry 950.

The main controller circuitry 910 is operable to process data, execute particular tasks or functions, and/or control operations of other components in the device 900. For example, the main controller circuitry 910 may receive sensory data from the sensor controller circuitry 950, which may correspond to gestures or movement by the operator wearing the device 900. The main controller circuitry 910 may process such sensory data by, for example, applying pre-programmed gesture recognition algorithms (and/or using pre-stored information, such as a gesture based library) to discern if the sensory data indicates a gesture or motion belonging to a set of trained gestures. If the gesture belongs to a set of trained gestures, the main controller circuitry 910 may identify the associated control actions. The main controller circuitry 910 may then control other components of the device in response to any identified actions or commands. For example, where a particular welding command is identified, the main controller circuitry 910 may send data and/or signals to the communication interface circuitry 920 for transmission of the command thereby (e.g., to the appropriate welding or weld monitoring equipment via WiFi or Bluetooth signal 921). The main controller circuitry 910 may also generate or determine suitable feedback (e.g., acknowledgment of detection of gestures/motions, validation of detected gestures/motion, acknowledgment of taking corresponding action, etc.) and may transmit data and/or signals to feedback related components (e.g., audio controller circuitry 930 or haptic controller circuitry 940) to effectuate providing the feedback.

The communication interface circuitry 920 is operable to handle communications in the gesture-based control device 900. The communication interface circuitry 920 may be configured to support various wired or wireless technologies. The communication interface circuitry 920 may be operable to, for example, configure, setup, and/or use wired and/or wireless connections, such as over suitable wired/wireless interface(s) and in accordance with wireless and/or wired protocols or standards supported in the device, to facilitate transmission and/or reception of signals (e.g., carrying data). Further, the communication interface circuitry 920 may be operable to process transmitted and/or received signals, in accordance with applicable wired or wireless technologies. Examples of wireless technologies that may be supported and/or used by the communication interface circuitry 920 may comprise wireless personal area network (WPAN), such as Bluetooth (IEEE 802.15); near field communication (NFC); wireless local area network (WLAN), such as WiFi (IEEE 802.11); cellular technologies, such as 2G/2G+(e.g., GSM/GPRS/EDGE, and IS-95 or cdmaOne) and/or 3G/3G+(e.g., CDMA2000, UMTS, and HSPA); 4G, such as WiMAX (IEEE 802.16) and LTE; Ultra-Wideband (UWB); etc. Examples of wired technologies that may be supported and/or used by the communication interface circuitry 920 comprise Ethernet (IEEE 802.3), Universal Serial Bus (USB) based interfaces, etc. Examples of signal processing operations that may be performed by the device 900 comprise, for example, filtering, amplification, analog-to-digital conversion and/or digital-to-analog conversion, up-conversion/down-conversion of baseband signals, encoding/decoding, encryption/decryption, modulation/demodulation, etc.

As shown in the example implementation depicted in FIG. 9, the communication interface circuitry 920 may be configured to use an antenna 922 for wireless communications and a port 414 for wired communications. The antenna 922 may be any type of antenna suited for the frequencies, power levels, etc. required for wireless interfaces/protocols supported by the gesture-based control device 900. For example, the antenna 922 may particularly support WiFi and/or Bluetooth transmission/reception. The port 924 may be any type of connectors suited for the communications over wired interfaces/protocols supported by the gesture-based control device 900. For example, the port 924 may comprise an Ethernet over twisted pair port, a USB port, an HDMI port, a passive optical network (PON) port, and/or any other suitable port for interfacing with a wired or optical cable.

The audio controller circuitry 930 is operable to handle audio input and/or output (I/O) functions associated with the device 900. For example, the audio controller circuitry 930 may be operable to drive one or more audio I/O elements 932 (e.g., audio transducers, each being operable to convert audio signals into electromagnetic signals or vice versa). In this regard, the audio controller circuitry 930 may generate and/or condition (e.g., amplify or, digitize) data corresponding to audio input or output (signals) in the device 900. For example, with respect to gesture-related operations in the device 900, the audio controller circuitry 930 may be operable to generate data or signals that cause an audio transducer to output an audio signal 931, which represents feedback provided to the operator using (e.g., wearing) the device 900 during welding operations in response to detection of gestures or motions by the operators.

The haptic controller circuitry 940 is operable to handle haptic input and/or output (I/O) functions associated with the device 900. For example, the haptic controller circuitry 940 may be operable to drive one or more haptic elements 942 (e.g., a buzzer or vibration transducer). In this regard, the haptic controller circuitry 940 may generate and/or condition (e.g., amplify or digitize) data corresponding to haptic output (signals) in the device 900. For example, with respect to gesture-related operations in the device 900, the haptic controller circuitry 940 may be operable to generate data or signals that cause a haptic element to output a haptic signal 941 (e.g., vibration). The haptic signal 941 may provide feedback to the operator using (e.g., wearing) the device 900 during welding operations. The haptic signal 941 may be generated in response to detection of gestures or motions by the operator.

The sensor controller circuitry 950 is operable to handle sensory related operations of the device 900. For example, the sensor controller circuitry 950 may be operable to drive or control one or more sensors that may be used in obtaining sensory data germane to operations of the device 900. Various types of sensors may be handled and/or supported by the sensor controller circuitry 950.

For example, in some instances muscle sensors 952 may be used. In this regard, each muscle sensor 952 may comprise a series of segmented electrodes arranged such that when the muscle sensor 952 is in contact with the operator's body (e.g., forearm) the electrodes may detect differential electrical impulses of nearby muscles. The sensory data obtained in this manner (alone or in conjunction with information from other sensors) may be used to detect and decode gestures made by the operator using part(s) of the body near the sensor on which the sensors reside (e.g., the arm, wrist, hand or fingers of the arm on which the sensors reside).

MEMS (micro-electro-mechanical systems) sensors 954 may also be used. They may be embedded directly into the device 900 and/or within other items worn or used by the operator (e.g., gloves). These sensors may generate sensory data relating to gestures or movements made by the operator (e.g., using hands, fingers, or wrists). The MEMS sensors 954 may comprise gyroscopic-based, accelerometer-based, and/or magnetic-based sensors. The MEMS sensors 954 may generate sensory data, which may be used (separately or in conjunction with sensory data from other sensors, such as muscle sensors 952) in detecting and decoding gestures or motions made by the operator.

As an example, where the device 900 is armband-based, the movement of the operator's arms may change the orientation of the device 900. Thus, the MEMS sensors 954 may generate sensory data that allows a determination of the orientation of the device, and changes thereof. Gyroscopic-based sensors, which can easily be used for sensing in the xyz orthogonal Cartesian coordinate system, may be used individually or in combination with other sensors to sense the overall movement and direction of movement of the entire arm on which the armband resides. The accelerometer-based sensors (particularly when configured for 3D sensing) may detect the pull of gravity or the gravity vector so the outputs of these can be used individually or in combination to determine the orientation of the device on the arm with respect to the generally accepted direction of "down" and "up". They can also be used, directly or by mathematical integration, to determine the velocity and direction of the arm containing the armband. The magnetic-based sensors, while perhaps being overwhelmed by the magnetic field in the proximity of the welding arc, could (when the arc is not in operation) determine the direction of "magnetic north," which can be used to direct an operator to move in a particular direction, perhaps to locate the piece of equipment being controlled when it is a long distance from the site upon which the operator is working.

While the device 900 is described as comprising all the components depicted in FIG. 9, the disclosure is not so limited, and as such some of these components may represent separate dedicated 'devices' which are merely coupled to the other components of the device 900. Further, because of its intended portable use, the device 900, or at least a main component thereof (e.g., a component comprising to at least the main controller circuitry 910) may be implemented as a rechargeable battery-powered platform, comprising the minimally required resources (e.g., processing or memory) to provide or enable the required detection, analysis, communication, and/or feedback functions. In some instances, the device 900 may be operable to log and/or store gestures, and/or gesture attempts (e.g., those that fail to match existing pre-defined gestures), such as to improve gesture recognition through statistical training.

Figure 10:
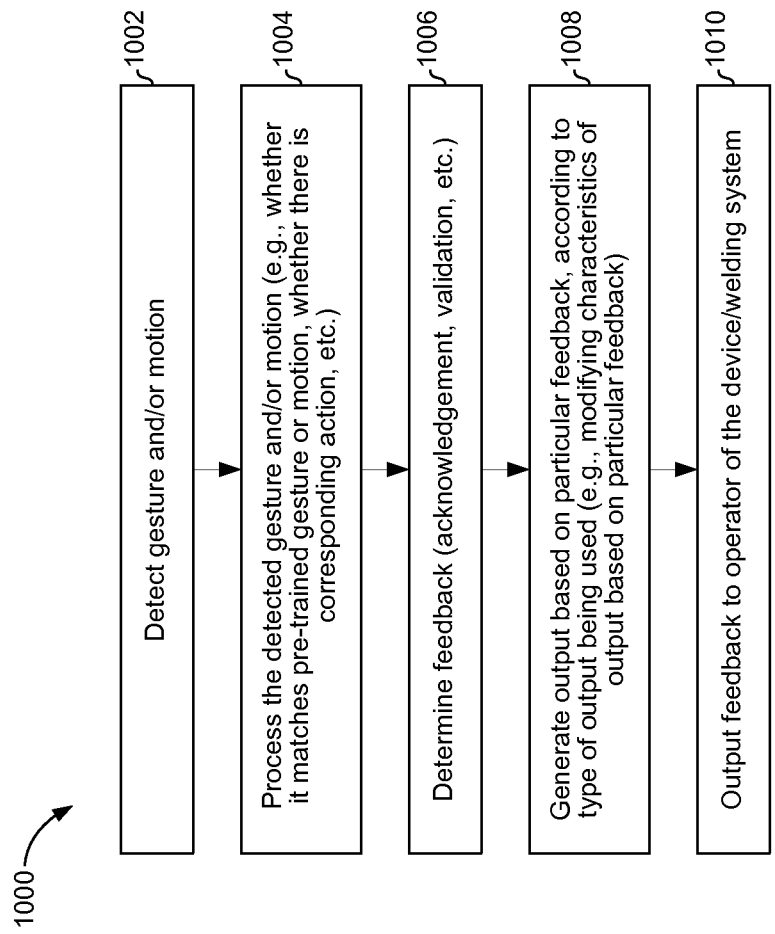
FIG. 10 is a flowchart illustrating an example method for providing feedback during gesture-based remote control of welding operations, in accordance with aspects of the present disclosure.

FIG. 10 is a flowchart illustrating an example method for providing feedback during gesture-based remote control of welding operations in accordance with aspects of the present disclosure. Shown in FIG. 10 is flow chart of a method 1000, comprising a plurality of example steps (represented as blocks 1002-1010).

In step 1002, gesture and/or motion of an operator may be detected, such as based on sensory data obtained from sensors placed on or near the operator (or integrated in item worn or used by the operator).

In step 1004, the detected gesture and/or motion may processed, such as to determine if the gesture and/or motion matches any pre-defined gesture or motion, and whether there are any associated actions corresponding thereto (e.g., a welding command or the programming of a new association).

In step 1006, it may be determined what feedback (if any) need be provided to the operator. The feedback may be an acknowledgement (e.g., that gesture/motion is detected, that action is determined, or that action is performed), a validation (e.g., requesting operator confirmation), and the like.

In step 1008, corresponding output may be generated based on the feedback. In particular, the output may be configured based on the feedback itself and the type of the output (e.g., modifying characteristics of output based on particular feedback). For example, with vibration based outputs, characteristics like intensity, frequency, and/or duration may be adjusted to reflect different feedback.

In step 1010, the feedback may be output to the operator.

The present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "example" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a detection component that is configured to detect a motion of an appendage of an operator of a welding system, wherein the detection component comprises one or more of: a camera, a magnetic sensor, a vibration sensor, a muscle movement sensor, a radio frequency energy detector, a sound sensor, a heat sensor, or a pressure sensor;
a gesture library comprising a plurality of stored motions and a plurality of stored commands, each stored motion of the plurality of stored motions being correlated with a stored command of the plurality of stored commands, each stored command being related to controlling a component or operation of the detection component or the welding system, and at least one stored command of the plurality of stored commands comprising a disable command;
processing circuitry that is configured to
determine whether the motion matches a stored motion of the plurality of stored motions,
in response to determining the motion does match the stored motion, determine a command of the plurality of stored commands that is correlated with the stored motion, and
execute the command, wherein execution of the command comprises disabling at least some portion or operation of the detection component when the command is the disable command.

2. The system of claim 1, further comprising a feedback component that is configured to provide output to the operator relating to the detected motions, wherein the output provided via the feedback component comprises non-visual output.

3. The system of claim 2, wherein the non-visual output comprises audio or haptic output.

4. The system of claim 2, wherein the feedback component is operable to modify one or more characteristics of the non-visual output based on input received from the operator of the welding system.

5. The system of claim 1, wherein the disabling comprises transitioning to a minimal-function state that is configured to allow for re-enabling the at least some portions or operations of the detection component in response to a re-enable request.

6. The system of claim 1, wherein each stored command of the plurality of stored commands is related to controlling the detection component, a welding power supply, a welding wire feeder, or a gas supply system.

7. The system of claim 2, further comprising an accessory device that is configured to be worn by the operator of the welding system or is otherwise disposed on the operator of the welding system, wherein the accessory device comprises at least a portion of each of the detection component, the processing circuitry, and the feedback component.

8. The system of claim 1, wherein the gesture library is stored within a local memory location or a global memory location.

9. The system of claim 4, further comprising a first accessory device and a second accessory device, the first and second accessory devices being configured to be worn by, or otherwise disposed on, the operator of the welding system, wherein the first accessory device and second accessory device comprise at least a portion of one or more of the detection component, the processing circuitry, or the feedback component, and wherein the input comprises specifying characteristics or parameters of the non-visual output via one or more input/output ports of the first accessory device or second accessory device.

10. The system of claim 4, wherein the one or more characteristics comprise one or more of a frequency, a duration, or an amplitude of the non-visual output.

11. A method comprising:
detecting, via a detection component, a motion of an appendage of an operator of a welding system based on sensory data obtained from one or more of: a camera, a magnetic sensor, a vibration sensor, a muscle movement sensor, a radio frequency energy detector, a sound sensor, a heat sensor, or a pressure sensor;
determining, via processing circuitry, whether the motion matches a stored motion of a plurality of stored motions stored in a gesture library, the gesture library comprising a plurality of stored motions and a plurality of stored commands, each stored motion of the plurality of stored motions being correlated with a stored command of the plurality of stored commands, each stored command being related to controlling a component or operation of the detection component or the welding system, and at least one stored command of the plurality of stored commands comprising a disable command;
in response to determining the motion does match the stored motion, determine a command of the plurality of stored commands that is correlated with the stored motion;
sending a command for controlling operation of the welding system based on the detected motions; and
executing the command, wherein executing of the command comprises disabling at least some portion or operation of the detection component when the command is a disable command.

12. The method of claim 11, further comprising providing, via a feedback component, output to the operator of the welding system relating to the detected motions, wherein the provided output comprises non-visual output.

13. The method of claim 12, wherein the non-visual output comprises audio or haptic output.

14. The method of claim 12, further comprising modifying one or more characteristics of the non-visual output based on input received from the operator of the welding system, the one or more parameters comprising a frequency, duration, or intensity of the non-visual output.

15. The method of claim 11, further comprising transitioning to a minimal-function state in response to the disable command, wherein the minimal-function state is configured to allow re-enabling at least some of the disabled portions or operations of the detection component in response to the command being a re-enable command.

16. The method of claim 12, further comprising providing the output to the operator of the welding system by generating signals for output via one or more of: display elements, vibration elements, and audio transducers.

17. The method of claim 11, wherein detecting the motion of the appendage of the operator further comprises using an accessory device configured to be worn by the operator of the welding system or otherwise disposed on the operator of the welding system, wherein the accessory device comprises at least a portion of each of the detection component, the processing circuitry, and the feedback component.

18. The method of claim 14, wherein:
an accessory device is used during said detecting of the motion of the operator;
the accessory device is configured to be worn by, or otherwise disposed on, the operator of the welding system;
the accessory device comprises at least a portion of one or more of the detection component, the processing circuitry, or the feedback component; and
the input comprises specifying characteristics or parameters of the non-visual output via one or more input/output ports of the accessory device.

19. The method of claim 11, wherein detecting, via the detection component, the motion of the appendage of the operator comprises detecting a first motion of the appendage corresponding to the command, and detecting a second motion of the appendage corresponding to a command confirmation.

* * * * *